US008407750B2

(12) United States Patent
Vorbau

(10) Patent No.: US 8,407,750 B2
(45) Date of Patent: Mar. 26, 2013

(54) ENABLING USERS OF PEER TO PEER CLIENTS TO SOCIALLY INTERACT WHILE VIEWING VIDEOS

(75) Inventor: W. Alex Vorbau, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 691 days.

(21) Appl. No.: 11/827,606

(22) Filed: Jul. 11, 2007

(65) Prior Publication Data

US 2009/0019503 A1    Jan. 15, 2009

(51) Int. Cl.
    *H04N 7/173* (2011.01)
(52) U.S. Cl. ............................. 725/109; 725/117
(58) Field of Classification Search ............ 725/109, 725/117
    See application file for complete search history.

(56) References Cited

U.S. PATENT DOCUMENTS

| 5,870,754 | A  | * | 2/1999  | Dimitrova et al. | 1/1 |
| 7,039,676 | B1 | * | 5/2006  | Day et al. | 709/204 |
| 7,716,376 | B1 | * | 5/2010  | Price et al. | 709/248 |
| 2002/0067909 | A1 | * | 6/2002  | Iivonen | 386/88 |
| 2002/0069218 | A1 | * | 6/2002  | Sull et al. | 707/501.1 |
| 2003/0002849 | A1 | * | 1/2003  | Lord | 386/46 |
| 2003/0105812 | A1 | * | 6/2003  | Flowers et al. | 709/203 |
| 2003/0156827 | A1 | * | 8/2003  | Janevski | 386/96 |
| 2004/0012578 | A1 | * | 1/2004  | Naegle | 345/204 |
| 2004/0148159 | A1 | * | 7/2004  | Crockett et al. | 704/211 |
| 2004/0240562 | A1 | * | 12/2004 | Bargeron et al. | 375/240.29 |
| 2007/0283403 | A1 | * | 12/2007 | Eklund et al. | 725/117 |
| 2007/0300250 | A1 | * | 12/2007 | Smith et al. | 725/20 |
| 2008/0059986 | A1 | * | 3/2008  | Kalinowski et al. | 725/1 |

OTHER PUBLICATIONS

Boertjes, Erik "ConnecTV: Share the Experience", http://soc.kuleuven.be/com/mediac/sociality/ConnecTV%20-%20Share%20the%20Experience.pdf, 1-2.

* cited by examiner

*Primary Examiner* — Robert Hance

(57) ABSTRACT

Embodiments of the present invention pertain to enabling users of peer to peer clients to socially interact while viewing videos. According to one embodiment, a first client and a second client are physically remote from each other. A first video and a second video are for the same show but are in different formats. The first client accesses the first video and the second client accesses the second video. The users of the first client and the second client are enabled to socially interact with each other using peer to peer communications between the first client and the second client.

16 Claims, 4 Drawing Sheets

ENABLING USERS OF PEER TO PEER CLIENTS TO SOCIALLY INTERACT WHILE VIEWING VIDEOS

TECHNICAL FIELD

Embodiments of the present invention relate to viewing videos. More specifically, embodiments of the present invention relate to enabling users of peer to peer clients to socially interact while viewing videos.

BACKGROUND ART

Since the advent of motion pictures, people have been going to theaters to watch movies. For example, a group of friends or a couple that is dating could go to a movie theater and watch a movie together. The television has enabled people to watch broadcast shows from their homes. A family could sit down together and watch a movie or an episode of a series on their television that is broadcast from a local television station or cable station. Videos have enabled people to watch shows at their own convenience. For example, a video, that is rented or bought, may be physically inserted into a video player. In another example, the video may be streamed to a television from the Internet or from a cable network station.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, components, and circuits have not been described in detail as not to unnecessarily obscure aspects of the present invention.

Overview

People tend to live large distances from their friends and family making it difficult for them to socialize in the same location. People are looking for ways to socialize that are convenient. According to one embodiment, people are enabled to watch a video together and socially interact with each other while watching the video even though they are not physically located together. Each of the persons in the group that will be watching the video may have different equipment and may end up accessing the video in a different format that may even be from a different source.

Figure 1:
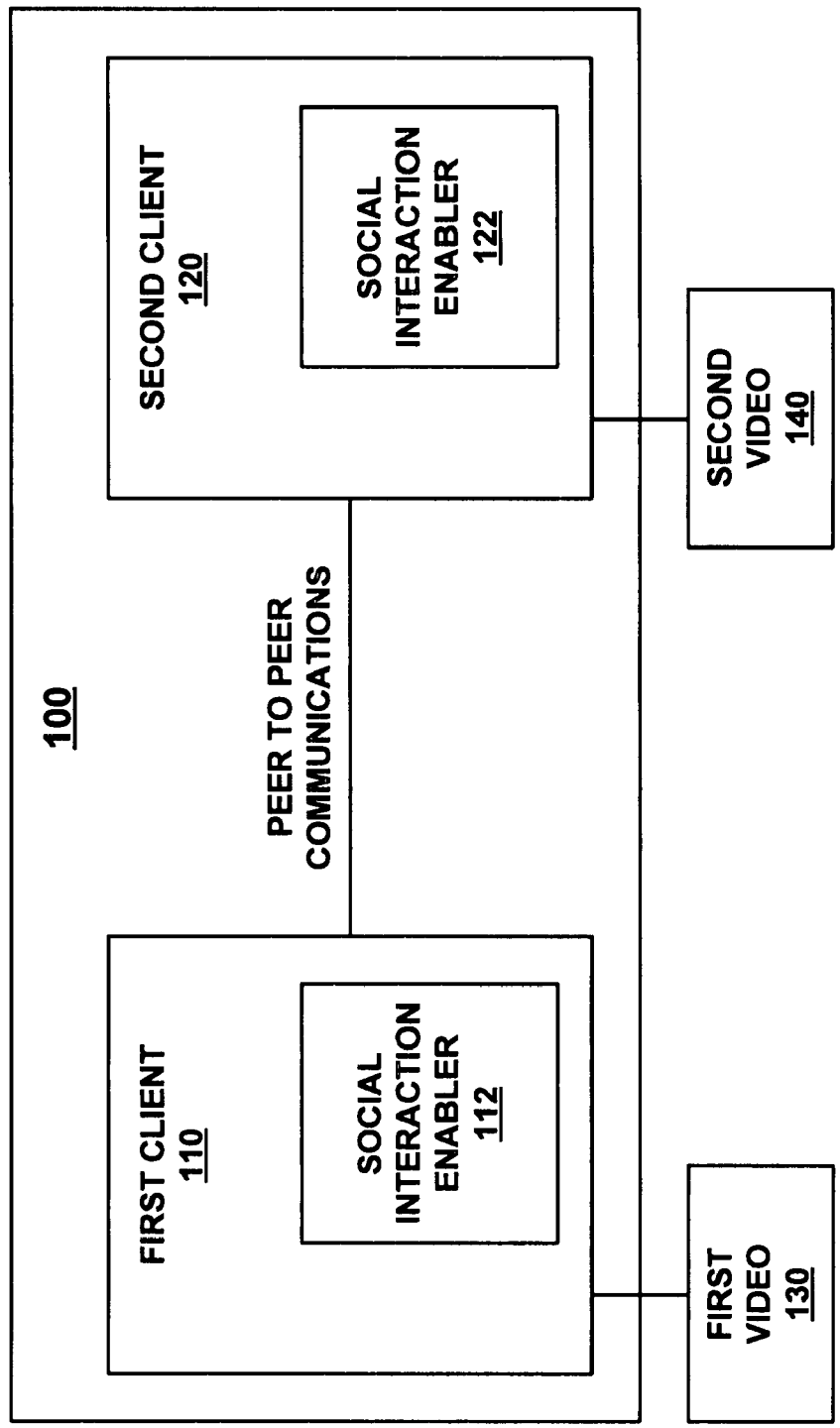
FIG. 1 depicts a block diagram a system that uses social interaction enables, according to one embodiment.

FIG. 1 depicts a block diagram a system 100 that uses social interaction enables, according to one embodiment. The system 100 includes a first client 110 and a second client 120 that are physically remote from each other and communicate using peer to peer communications. The clients 110, 120 include respective social interaction enablers 112 and 122. The first video 130 and the second video 140 pertain to the same show but are in different formats. The first and second clients 110, 120 access the respective first and second videos 130, 140 allowing the users to view the show on their respective clients 110, 120. The social interaction enabler 112, 122 allows the users of the clients 110, 120 to socially interact with each other while they view the show from their respective clients 110, 120. For example, the first video 130 and the second video 140 are paused if either of the users presses a pause button on their respective remotes. The social interaction enablers 112, 122 can also be used to convey non-verbal cues between the users, as will become more evident. According to one embodiment, a social interaction enabler 112, 122 enables social interactions by synchronizing the first video 130 and the second video 140, as will become more evident.

Social Interactions

According to one embodiment, people are enabled to watch a video together and socially interact with each other while watching the video. The respective clients that the people use to access the video include systems that enable social interactions, according to one embodiment. A social interaction may be verbal or non-verbal. For example, voice over IP (Voip) may be used for a social interaction. Examples of non-verbal interactions include causing an action initiated by one of the users to be performed for all of the videos viewed by all of the users. For example, if one of the users presses the pause button, then the videos for the other users are also paused. Similarly, if one of the users presses the play button they the videos for the other users also begin to play. Lastly, if one of the users performs a seek to a particular location on their video, then a seek is also performed to approximately the same location for the videos being viewed by the other users.

According to one embodiment, a social interaction indicates which user the social interaction originated from. For example, text indicating the name of the user that initiated the social interaction may be displayed on the clients of the other users.

When people watch shows together in the same room, the people are able to observe each other's body language. For example, when a commercial begins, they might start to talk with each other. When the commercial ends, they may turn away from each other and start to watch in silence again. In another example, if a parent is distracted by their small child, another person who is watching may see that the parent has been distracted and pause the video until the parent is able to refocus on the video. According to one embodiment, an indication of one user's non-verbal cue is provided to the other users. In one example, a user who is about to leave the room may interact with their client to cause a text message indicating that they are leaving the room to be displayed on the other users' clients. In another example, sensors may detect that a user has turned away from their client and cause an indication that the user is distracted to be provided to the other users' clients. A sensor may be located in the room that the user is or may be on a user's body, among other things. In yet another example, a user may use a 3D (three dimensional) accelerometer-enabled remote control to communicate non-verbal cues. The user may wave the remote a certain way to signify that they are done talking and ready to re-engage in watching the video.

Videos

Two or more users watch the same show on videos in different formats using their respective clients, according to one embodiment. A movie is one example of a show. An episode of a television (TV) series is another example of a show. A show may be located on the Internet, may be broadcast by a TV station, or may be stored on a disk. The show may be pre-recorded and played later.

Examples of formats include but are not limited to Moving Pictures Experts Group 2 (MPEG-2), H.264, H.263, and MPEG-4. H.264 is typically used by Apple™, H.263 is typically used for 3G video phones, and MPEG-4 is frequently used by videos downloaded from Bit Torrent™.

The show may be from different vendors (also referred to herein as "sources"). Examples of vendors include but are not limited to Bit Torrent™, a cable company such as Comcast™, iTunes™ and iPOD™.

Clients

Examples of a client that accesses a video include but is not limited to a television (TV), a computer, a mobile device. The client may include software for a platform such as Microsoft™ and Linux™. In another example, the platform may be provided by Apple™. The mobile device may be a 3G video phone.

Various types of equipment may be used in association with the client For example, X box Live™, Windows Media Center™ or Myth TV™ may be used to connect the client to an on line service that provides videos. A client may include equipment to pre-record videos that can be played later. A client may be a part of a home theater.

Synchronizing

According to one embodiment, the first video and the second video are synchronized with each other. The intensity of the audio associated with the videos can be used to synchronize the videos. For example, the videos can be analyzed to determine a location in both of the videos where the intensity of the audio is approximately the same. The audio may be analyzed for a location where the audio for two different videos is at approximately the same level of loudness. In another example, the videos can be analyzed for brightness to synchronize locations of both of the videos. In yet another example, the videos can be analyzed for color to synchronize locations of both of the videos. A location where a high level of loudness occurs in the audio shall be referred to as an "audio signature" and a location where a particular contrast between lightness and darkness or color occurs shall be referred to as a "visual signature."

Figure 2:
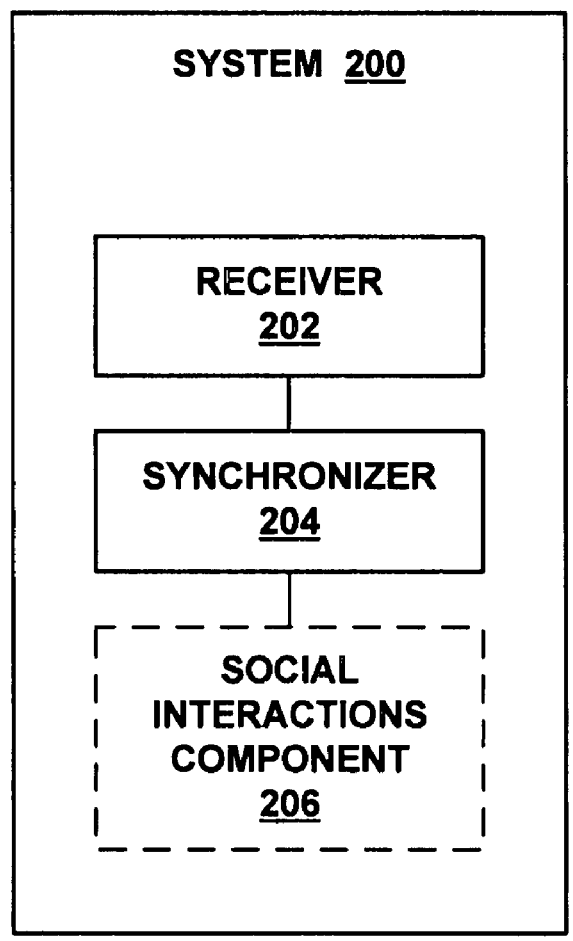
FIG. 2 depicts a system of enabling users of peer to peer clients to socially interact while viewing videos, according to one embodiment.

A System of Enabling Users of Peer to Peer Clients to Socially Interact while Viewing Videos FIG. 2 depicts a system of enabling users of peer to peer clients to socially interact while viewing videos, according to one embodiment. The blocks depicted in FIG. 2 represent features of the system 200. The blocks that represent features in FIG. 2 can be arranged differently than as illustrated, and can implement additional or fewer features than what are described herein. Further, the features represented by the blocks in FIG. 2 can be combined in various ways. The system 200 can be implemented using software, hardware, firmware, or a combination thereof.

The system 200 includes a video position receiver 202 (also referred to herein as a "receiver") and a video from different format peer to peer synchronizer 204 (also referred to herein as a "synchronizer"). The receiver 202 is configured for receiving data indicating a position that a first client is accessing a first video. The receiver 202 is also configured for receiving at a first client data indicating a position that a second client is accessing a second video. The first video and the second video are for the same show and are in different formats. Peer to peer communications are used between the first client and the second client. The synchronizer 204 is configured for using the positions of the first video and the second video to synchronize positions of the first video and the second video whereby social interaction between the users of the first client and the second client is enabled. According to one embodiment, the system 200 includes an optional social interactions component 206 for determining a social interaction for a user of a client the social interaction component resides on and for communicating the determined social interaction to a social interactions component associated with another client. According to one embodiment, a system 200 is in a library that clients can access.

According to one embodiment, the synchronizer 204 is an example of a social interaction enabler 112, 122 (FIG. 1). For example, synchronizing the videos enables the users of the respective clients to socially interact. Synchronizing the videos enables one user to know that a particular non-verbal cue from another user pertains to a particular part of the video. Synchronizing the videos enables the social interactions of pausing, playing and seeking, as described herein, to function properly.

Figure 3:
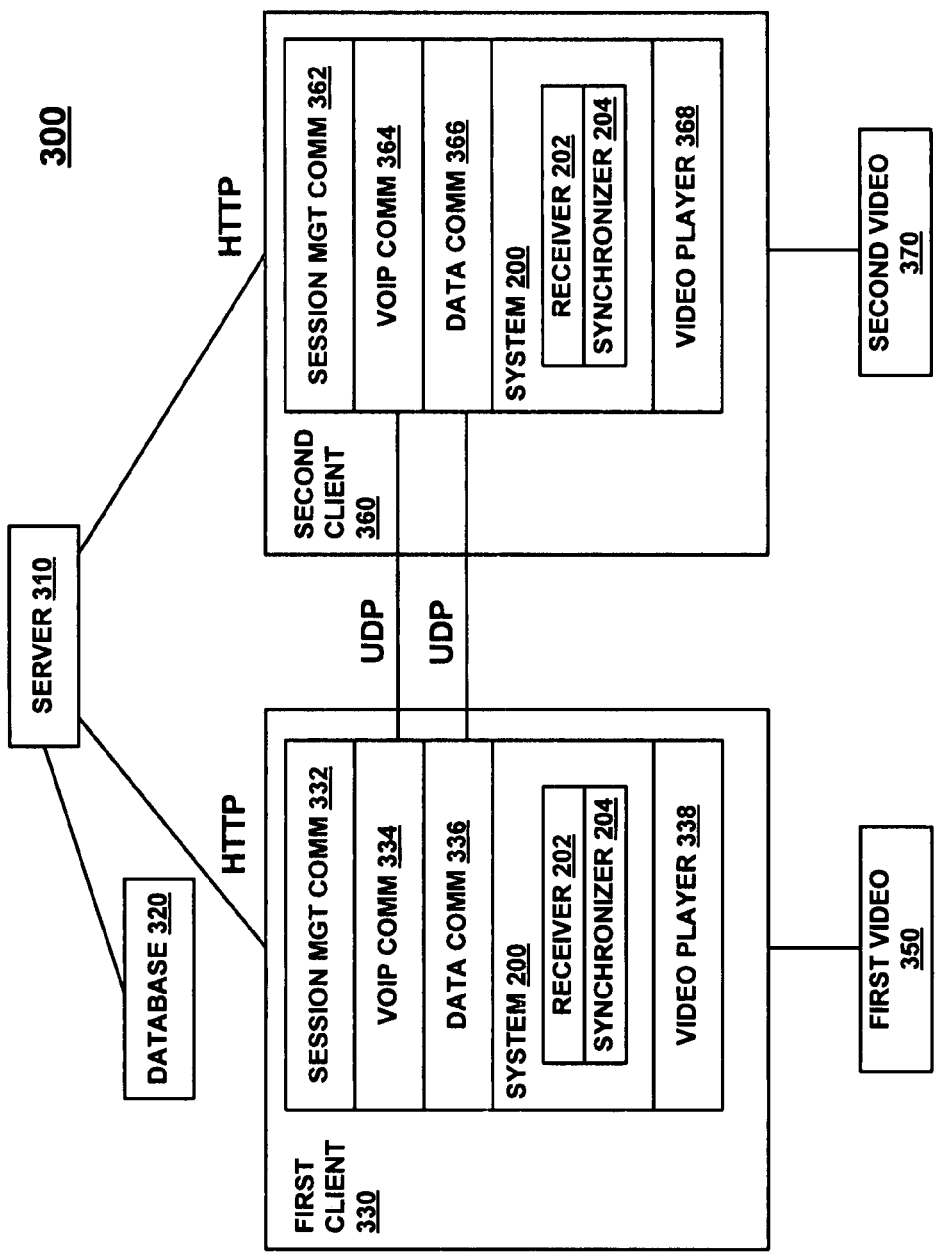
FIG. 3 is a block diagram of a client server system that uses a system that enables users of peer to peer clients to socially interact while viewing videos, according to one embodiment.

FIG. 3 is a block diagram of a client server system 300 that uses a system 200, according to one embodiment. The system 300 includes a server 310, a database 320, clients 330, 360, and videos 350, 370. According to one embodiment, the server 310 is located in a network, such as the Internet and the clients 330, 360 are in proximity of the respective users. The videos 350, 370 may be obtained, among other things, from the Internet or inserted into a video player, such as a DVD player.

The server 310 enables users to register and the database 320 includes information pertaining to the registered users, according to one embodiment. The clients 330, 360 each include respective session management communications 332, 362, Voip communications 334, 364, data communications 336, 366, systems 200, and video players 338, 368. The database 320 is communicatively coupled to the server 310, the server 310 is communicatively coupled to the clients 330, 360, the clients 330, 360 are communicatively coupled to each other and the clients 330, 360 can access respective videos 350, 370. The clients 330, 360 communicate with the server 310 using HTTP and the clients 330, 360 communicate with each other using UDP. The session management communicators 332, 362 enable a session to be established with the server 310. The Voip communicators 334, 364 enable Voip communications between the clients 330, 360, for example, using UDP. The data communicators 336, 366 enable messages for example about social interactions among other things between the clients 330, 360, for example, using UDP. The video players 338, 368 play the respective videos 350, 370. Although FIG. 3 depicts HTTP and UDP, other protocols may be used for communications between the clients 330, 360 and the server 310 or between the clients 330, 360.

According to one embodiment, an open framework is provided. For example, the video players 338, 368 on the first client 330 and the second client 360, among other things may be provided by different vendors for playing videos with different formats as well as from different sources. Similarly, the different vendors may provide the session management communicators 332, 362, voip communicators 334, 364 and the data communicators 336, 366 for the different clients 330, 360. The communications between the data communicators 336, 366 and the voip communicators 334, 364, among other things, conforms to a specification, according to one embodiment. The specification for example may be provided by the company that writes the system 200.

Figure 4:
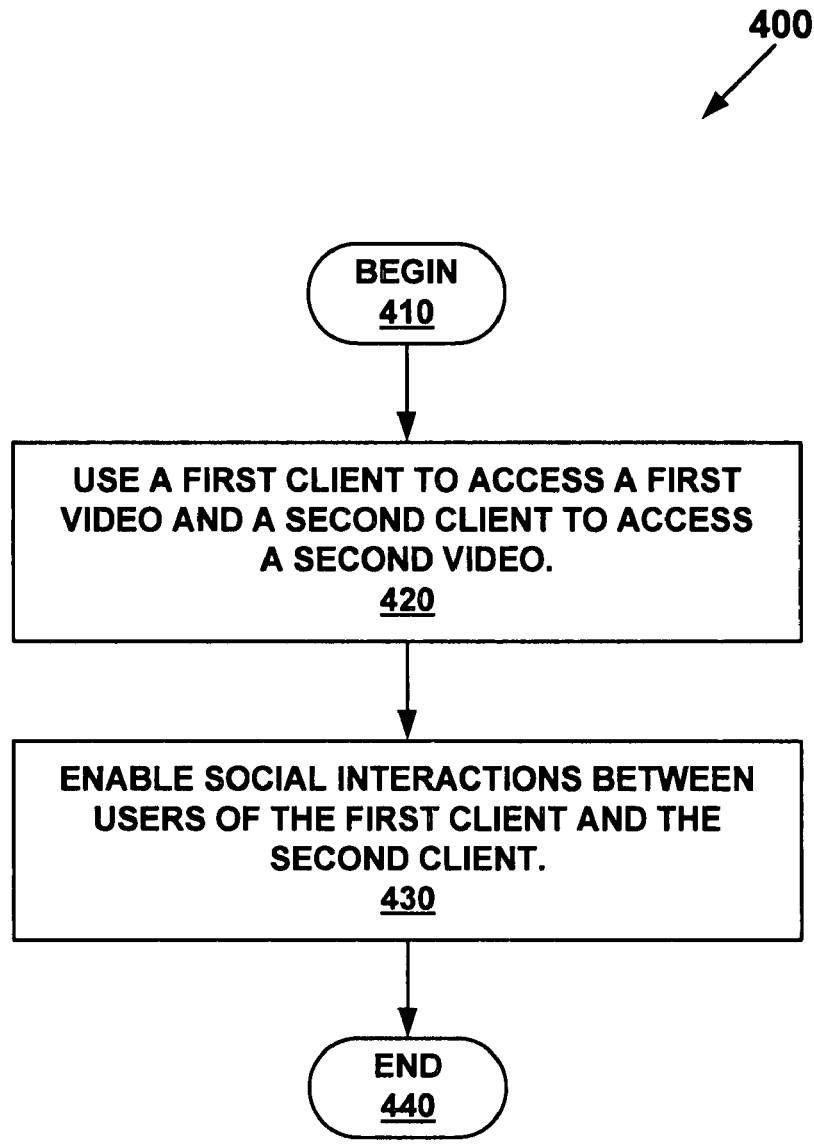
FIG. 4 is a flowchart of a method of enabling users of peer to peer clients to socially interact while viewing videos, according to one embodiment.

A Method of Enabling Users of Peer to Peer Clients to Socially Interact while Viewing Videos FIG. 4 is a flowchart 400 of a method of enabling users of peer to peer clients to socially interact while viewing videos, according to one embodiment. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed.

All of, or a portion of, the embodiments described by flowchart 400 can be implemented using computer-readable and computer-executable instructions which reside, for example, in computer-usable media of a computer system or like device. As described above, certain processes and steps of the present invention are realized, in an embodiment, as a series of instructions (e.g., software program) that reside within computer readable memory of a computer system and are executed by the of the computer system. When executed, the instructions cause the computer system to implement the functionality of the present invention as described below.

The description of flowchart 400 shall refer to FIG. 3. Assume for the sake of illustration that the first client 330 is located in San Jose Calif. and the second client 360 is located in Denver Colo., the show is a particular episode of the classic television series the Honeymooners™.

According to one embodiment, to prepare for viewing, one of the users, such as the user of the first client 330 will register with the server 310. For example, when the first user installs the system 200 on their computer 330, the computer 3130 prompts the first user to register with the server 310. An account is created for the first user and is stored in the database. Assume that the first user wants to view an episode of the Honeymooners™ with a friend that is the user (also referred to as the "second user"), of the second client 360. The first user interacts with their computer 330 to host a session. The first computer 330 communicates with the server 310 over HTTP. The first user is prompted for information pertaining to the session such as when the session will start, how long it will last, who will be invited, among other things. The first user indicates that they want to invite the second user. The server 310 transmits an invitation to the second client 360 to let the second user know they have been invited. The second user responds to the invitation and information about the second user is stored in the database 320. When the time of the session approaches the session is created. The first user may wait for the second user to join the session. As a part of joining the session, the second client 360 may send a message to the server 310 requesting to join. The server 310 coordinates communications between the first client and the second client so that the first client and the second client can use peer to peer communications between each other, according to one embodiment.

Step 410, the method begins.

Step 420, a first client accesses a first video and a second client accesses a second video. Assume for the sake of illustration that the first video 350 is in the MPEG-2 format and the second video 370 is in the H.264 format. The first client 330 accesses the first video 350 and the second client 360 accesses the second video 370. The video players 338, 368 associated with the clients 330, 360 play the respective videos 350, 370.

In step 430, the users of the first client and the second client are enabled to socially interact with each other using peer to peer communications between the first client and the second client. For example, assume that the first user presses the play button. The first client 330's receiver 202 and the data communicator 336 receive information indicating that video 350 is going to start. The receiver 202 may receive the information first and send it to the data communicator 336. The first client 330's data communicator 336 transmits a message to the second client 360's data communicator 366 indicating to start its video 370.

The receivers 202 on the two clients 330, 360 can pass the location information to the synchronizers 204 on the two clients 330, 360. The systems 200 can analyze the respective videos 350, 370 for signatures and communicate the locations of the signatures to the synchronizers 204. The signatures may be audio signatures, visual signatures, or a combination thereof.

The data communicators 336, 366 can communicate location information between the clients 330, 360. The synchronizers 204 can use the location information for the video 350, 370 being accessed by their respective clients 330, 360 and the location information from the other client to synchronize the videos 330, 360. For example, the first client 330's synchronizer 204 can use the location of the first video 350 and the location of the second video 370 communicated from the second client 360's data communicator 366 to the first client 330's data communicator 336 to cause the first video 350 to be synchronized with the second video 370. Similar processing can be used by the second client 360 to synchronize the second video 370 with the first video 350.

The data communicators 336, 366 can also communicate information pertaining to social cues. For example, if the first user presses the play or pause button the first client 330's data communicator 336 can transmit a message indicating that the play or pause button was pushed to the second client 360's data communicator. The message can also indicate that the first user was the one that the social interaction originated from.

The voip communicators 334, 364 can communicate verbal social cues between the clients 330, 360. For example, if the first user says, "hey, this is a great scene" the first client 330's voip communicator 334 can transmit a message that includes audio "hey, this is a great scene" to the second client 360's voip communicator 366. A social interaction component 206 can coordinate the transmission of messages pertaining to social cues by the data communicators 336, 366 and the voip communicators 334, 364, among other things. Continuing the example, the first client 330's social interaction component 206 may cause the first client 330's voip communicator 334 to transmit a message that includes the audio "hey, this is a great scene" to the second client 360's voip communicator 364. The message may also include an indication that the verbal social cue originated from the first user.

In step 440, the method ends.

Various embodiments have been described in various combinations. However, any two or more embodiments may be combined. Further, any embodiment may be used separately from other embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of enabling users of peer to peer clients to socially interact while viewing videos, the method comprising:
   using a first client to access a first video and a second client to access a second video, wherein the first video and the second video are for the same show and are in different formats and the first video and the second video are not required to be from the same source;
   enabling the users of the first client and the second client to socially interact with each other using peer to peer communications between the first client and the second client that are physically remote to each other; and
   synchronizing the first video and the second video using a visual signature based on color associated with at least one of the videos, wherein the using of the signature associated with the at least one of the videos to synchronize the first video and the second video further comprises using a second visual signature based on changes in light and darkness associated with the at least one of the videos.

2. The method as recited by claim 1, wherein the using of the first client to access the first video and the second client to access the second video further comprises:
   accessing the first video and the second video, wherein the first video and the second video are in different formats selected from a group consisting of Moving Pictures Experts Group 2 (MPEG-2), H.264, H.263, and MPEG-4.

3. The method as recited by claim 1, wherein the method further comprises:
   obtaining the first video and the second video from different vendors.

4. The method as recited by claim 1, wherein the using a signature associated with the at least one of the videos to synchronize the first video and the second video further comprises:
   using an audio signature based on loudness of audio associated with the at least one of the videos.

5. A system of enabling users of peer to peer clients to socially interact while viewing videos, the system comprising:
   a video position receiver configured for receiving data indicating a position that a first client is accessing a first video;
   the video position receiver configured for receiving at a first client data indicating a position that a second client is accessing a second video, wherein the first video and the second video are for the same show and are in different formats, wherein the first video and the second video are not required to be from the same source and wherein peer to peer communications are used between the first client and the second client, which is not required to be in dose proximity with the first client; and
   a video from different format peer to peer synchronizer configured for using the positions of the first video and the second video to synchronize positions of the first video and the second video whereby social interaction between the users of the first client and the second client is enabled, wherein the positions of the first video and the second video are determined based upon a visual signature created using color associated with at least one of the videos, wherein the synchronizing of positions of the first video and the second video further comprises using a second visual signature based on changes in light and darkness associated with the at least one of the videos.

6. The system of claim 5, wherein the system further comprises:
   a social interaction component for coordinating transmission of a message pertaining to a non-verbal social cue between the first client and the second client.

7. The system of claim 6, wherein the non-verbal social cue pertains to an operation selected from a group consisting of a pause button being pressed, a play button being pressed, and a seek operation being performed.

8. The system of claim 6, wherein the non-verbal social cue pertains to body language of a first user.

9. The system of claim 8, wherein a sensor detected the body language.

10. The system of claim 8, wherein the first user interacted with the first client to cause a description of their body language to be displayed on the second client.

11. The system of claim 5, wherein the first client communicates with a server to register.

12. The system of claim 11, wherein the first client interacts with the server to invite the second client to view the show.

13. The system of claim 11, wherein the server enables the first client and the second client to communicate with each other using the peer to peer communications.

14. A non-transitory computer-usable medium having computer-readable program code embodied therein for causing a computer system to perform a method of enabling users of peer to peer clients to socially interact while viewing videos, the method comprising:
   using a first client to access a first video and a second client to access a second video, wherein the first video and the second video are for the same show and are in different formats and the first video and the second video are not required to be from the same source;
   enabling the users of the first client and the second client to socially interact with each other using peer to peer communications between the first client and the second client that are physically remote to each other; and
   synchronizing the first video and the second video using a visual signature based on color associated with at least one of the videos, wherein the using a signature associated with the at least one of the videos to synchronize the first video and the second video further comprises using a second visual signature based on changes in light and darkness associated with the at least one of the videos.

15. The non-transitory computer-usable medium of claim 14, wherein the computer-readable program code embodied therein causes a computer system to perform the method, and wherein the user of the first client to access the first video and the second client to access the second video further comprises:

accessing the first video and the second video from different vendors that are selected from a group consisting of Bit Torrent™, Comcast™, and iTunes™.

16. The non-transitory computer-usable medium of claim 14, wherein the computer-readable program code embodied therein causes a computer system to perform the method, and wherein the using of the first client to access the first video and the second client to access the second video further comprises:

accessing the first video and the second video, wherein the first video and the second video are in different formats selected from a group consisting of Moving Pictures Experts Group 2 (MPEG-2), H.264, H.263, and MPEG-4.

* * * * *

UNITED STATES PATENT AND TRADEMARK OFFICE
CERTIFICATE OF CORRECTION

PATENT NO. : 8,407,750 B2  
APPLICATION NO. : 11/827606  
DATED : March 26, 2013  
INVENTOR(S) : W. Alex Vorbau Page 1 of 1

It is certified that error appears in the above-identified patent and that said Letters Patent is hereby corrected as shown below:

In the Claims;

In column 8, line 7, in Claim 5, delete "dose" and insert -- close --, therefor.

Signed and Sealed this  
Thirteenth Day of August, 2013

Teresa Stanek Rea  
*Acting Director of the United States Patent and Trademark Office*